United States Patent
Okazaki

(10) Patent No.: US 9,461,804 B2
(45) Date of Patent: Oct. 4, 2016

(54) LINK AGGREGATION MANAGEMENT SYSTEM, LINK AGGREGATION MANAGEMENT DEVICE, LINK AGGREGATION MANAGEMENT METHOD AND COMPUTER-READABLE MEDIUM

(75) Inventor: Kohei Okazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 161 days.

(21) Appl. No.: 14/127,154

(22) PCT Filed: Jun. 13, 2012

(86) PCT No.: PCT/JP2012/003855
§ 371 (c)(1),
(2), (4) Date: Dec. 17, 2013

(87) PCT Pub. No.: WO2013/001732
PCT Pub. Date: Jan. 3, 2013

(65) Prior Publication Data
US 2014/0126511 A1 May 8, 2014

(30) Foreign Application Priority Data

Jun. 29, 2011 (JP) .................................. 2011-144107

(51) Int. Cl.
*H04L 5/00* (2006.01)
*H04W 72/06* (2009.01)
(Continued)

(52) U.S. Cl.
CPC ............ *H04L 5/0058* (2013.01); *H04L 1/0026* (2013.01); *H04L 45/245* (2013.01);
(Continued)

(58) Field of Classification Search
None
See application file for complete search history.

(56) References Cited

U.S. PATENT DOCUMENTS

2002/0010866 A1   1/2002  McCullough et al.
2002/0067309 A1*  6/2002  Baker et al. .................. 342/367
(Continued)

FOREIGN PATENT DOCUMENTS

CN    101378584 A    3/2009
JP    2000-261398    9/2000
(Continued)

OTHER PUBLICATIONS

Russian Office Action Decision on Grant issued by the Russian Federal Service on Intellectual Property for Application No. 2014102732 dated Mar. 25, 2015 (17 pages).
(Continued)

*Primary Examiner* — David Oveissi
(74) *Attorney, Agent, or Firm* — Wilmer Cutler Pickering Hale and Dorr LLP

(57) ABSTRACT

A first apparatus 101 and a second apparatus 102 carry out wireless data communication using a wireless transmission path that uses a plurality of physical links in parallel. In each of the apparatuses, input/output ports 111 to 113 input and output data. A plurality of wireless signal processing means 141 to 143 respectively control different ones of the physical links. The wireless signal processing means 141 to 143 respectively measure reception signal levels of the physical links, and notify a counterpart apparatus about the reception signal levels. Link aggregation control means 130 determines a priority for each of the physical links based on the signal level for each of the physical links. The packet transfer processing means 141 to 143 select, out of the physical links structuring the wireless transmission path, the physical link having a usable band of a prescribed capacity and high priority as the data recipient.

8 Claims, 4 Drawing Sheets

(51) Int. Cl.
    *H04L 12/709*    (2013.01)
    *H04L 12/891*    (2013.01)
    *H04L 12/851*    (2013.01)
    *H04L 12/825*    (2013.01)
    *H04L 1/00*      (2006.01)
    *H04W 40/12*     (2009.01)
    *H04W 72/08*     (2009.01)
    *H04L 12/863*    (2013.01)

(52) U.S. Cl.
    CPC .............. *H04L 47/24* (2013.01); *H04L 47/26* (2013.01); *H04L 47/41* (2013.01); *H04W 40/12* (2013.01); *H04W 72/06* (2013.01); *H04L 47/626* (2013.01); *H04W 72/085* (2013.01)

(56) References Cited

U.S. PATENT DOCUMENTS

| | | | |
|---|---|---|---|
| 2003/0060173 | A1 | 3/2003 | Lee et al. |
| 2009/0274131 | A1 | 11/2009 | Lee et al. |
| 2009/0305690 | A1* | 12/2009 | Yuda et al. ............ 455/422.1 |
| 2010/0195562 | A1 | 8/2010 | Ishizu et al. |
| 2012/0023252 | A1 | 1/2012 | Helmke |

FOREIGN PATENT DOCUMENTS

| | | |
|---|---|---|
| JP | 2001-168795 | 6/2001 |
| JP | 2009-232400 | 10/2009 |
| JP | 2010-183376 | 8/2010 |
| JP | 2010-232984 | 10/2010 |
| RU | 2209528 C2 | 7/2003 |
| RU | 2301499 C1 | 6/2007 |
| WO | WO-02/45293 A2 | 6/2002 |
| WO | WO-2006/113090 A2 | 10/2006 |
| WO | WO-2010/063309 A1 | 6/2010 |

OTHER PUBLICATIONS

International Search Report corresponding to PCT/JP2012/003855, dated Jun. 29, 2012, 5 pages.
Extended European Search Report issued by the European Patent Office for Application No. 12804708.1 dated Feb. 25, 2015 (6 pages).
Chinese First Office Action issued in corresponding Chinese Patent Application No. 201280031602.2, dated Jun. 22, 2016, 22 pages.

* cited by examiner

LINK AGGREGATION MANAGEMENT SYSTEM, LINK AGGREGATION MANAGEMENT DEVICE, LINK AGGREGATION MANAGEMENT METHOD AND COMPUTER-READABLE MEDIUM

CROSS-REFERENCE TO RELATED APPLICATIONS

This application is a national stage application of International Application No. PCT/JP2012/003855 entitled "Wireless Transmission System, Wireless Transmission Device, Wireless Transmission Method and Computer-Readable Medium," filed on Jun. 13, 2012, which claims the benefit of the priority of Japanese Patent Application No. 2011-144107, filed on Jun. 29, 2011, the disclosures of each of which are hereby incorporated by reference in their entirety.

TECHNICAL FIELD

The present invention relates to a wireless transmission system, a wireless transmission apparatus, a wireless transmission method, and a wireless transmission program. In particular, the present invention relates to a wireless transmission system, a wireless transmission apparatus, a wireless transmission method, and a wireless transmission program, with which prescribed communication quality can be secured in wireless communication using a link aggregation technique.

BACKGROUND ART

Nowadays, a wireless transmission system in which signals are transmitted among a plurality of transmission apparatuses using wireless communication is widely used. The wireless transmission system does not require provision of fixed cables among the transmission apparatuses, and signals are transmitted using radio waves.

In recent years, in order to improve the transmission rate in a wireless transmission system, wireless signals are modulated by a multi-value modulation scheme such as 256 QAM (Quadrature Amplitude Modulation) and at high modulation speeds. However, because of the characteristic of the wireless transmission system, i.e., carrying out communication by causing wireless signals to propagate through the air, the wireless transmission system is susceptible to various factors in wireless transmission links, and therefore the communication quality tends to deteriorate. Accordingly, even when the aforementioned modulation scheme or the like is used, enormous overhead is required to carry out an error correcting process using error correcting codes and the like. Consequently, as compared to the wired transmission system via fixed cables, the wireless transmission system has a restriction in that it is difficult to widen the communication band.

As a measure to address the problem in widening the communication band, in the field of packet communication such as Ethernet (registered trademark), the link aggregation technique in which a plurality of physical links are bundled and can be used as one virtual link is defined as IEEE 802.3ad. Here, the physical link refers to the infrastructure of the physical layer that carries out transmission of electric signals in response to a service request from the data link layer. In other words, the physical link refers to a physical transmission path. According to the link aggregation, for example, a bundle of five physical links each being 100 Mbps can be used as a virtual link of 500 Mbps.

CITATION LIST

Patent Literature

Patent Literature 1: Japanese Unexamined Patent Application Publication No. 2009-232400

SUMMARY OF INVENTION

Technical Problem

It is considered that, when such a link aggregation technique can be applied also to the wireless transmission system, the communication band can be increased.

With the link aggregation, when signals are transmitted using a virtual link, a transmission apparatus must specifically select the physical link to which frames are input. However, IEEE 802.3ad does not define the rule as to the physical link selection in connection with the link aggregation. In general, the transmission apparatus determines the physical link to be the recipient of transferred transmission frames in accordance with a prescribed calculation algorithm, based on parameters such as the header field (the MAC address, the VLAN tag, the IP address and the like) of transmission frames, an identifier being unique to the physical link (such as the physical port ID), a preset priority and the like. In such a selection algorithm of the physical link, the state of the physical link is not taken into consideration.

As described above, with the wireless transmission system, the communication quality of the wireless transmission links tends to deteriorate. Accordingly, when the link aggregation is applied to the wireless transmission system as it is, the transmission apparatus may possibly transmit frames to the wireless transmission link whose signal quality is deteriorating, despite their being high priority traffic. At this time, when the recipient transmission apparatus cannot demodulate the signals transmitted via the wireless transmission link of low reception signal level, the transmitted frames are lost. Accordingly, there is a problem that the conventional link aggregation technique cannot guarantee the quality of high priority traffic.

On the other hand, even when the reception signal level of the wireless transmission link is low, for example, applying the adaptive modulation radio scheme (AMR: Adaptive Modulation Radio) with which a few-value modulation scheme such as 16 QAM or QPSK (Quadrature Phase Shift Keying) can be automatically selected in accordance with a reception signal level, demodulation can be carried out with a suppressed frame loss. However, since the transmission rate of such a few-value modulation scheme is relatively low, there is a problem that the band being sufficient for transmission of high priority traffic cannot be obtained.

Accordingly, the wireless transmission system to which the link aggregation technique is applied requires a frame distribution algorithm that is suitable for the quality of each wireless transmission link, i.e., the band.

The present invention is made to solve such problems, and an object thereof is to provide a wireless transmission system, a wireless transmission apparatus, a wireless transmission method, and a computer readable medium, with which prescribed communication quality can be secured in wireless communication using the link aggregation technique.

Solution to Problem

A wireless transmission system according to the present invention is directed to a wireless transmission system including a first apparatus and a second apparatus that carry out wireless data communication via a wireless transmission path using a plurality of physical links in parallel. The first apparatus and the second apparatus each include: an input/output port that inputs and outputs data; a plurality of wireless signal processing means for respectively controlling different ones of the physical links, the plurality of wireless signal processing means respectively measuring reception signal levels of the physical links, and the plurality of wireless signal processing means notifying a counterpart one of the first and second apparatuses about the reception signal levels; link aggregation control means for determining a priority for each of the physical links based on the signal level for each of the physical links notified by the wireless signal processing means of the counterpart apparatus; and packet transfer processing means for selecting, out of the physical links structuring the wireless transmission path, the physical link having a usable band of a prescribed capacity and a high priority as a data recipient.

Other wireless transmission system of the present invention is directed to a wireless transmission system including a first apparatus and a second apparatus that carry out wireless data communication via a wireless transmission path using a plurality of physical links in parallel. The first apparatus and the second apparatus each include: an input/output port that inputs and outputs data; a plurality of wireless signal processing means for respectively controlling different ones of the physical links; and packet transfer processing means for selecting, out of the physical links structuring the wireless transmission path, the physical link having a usable band of a prescribed capacity and a high priority as a data recipient. The wireless signal processing means of the second apparatus respectively measure reception signal levels of the physical links, the wireless signal processing means of the second apparatus notifying the first apparatus about the reception signal levels. The first apparatus further includes link aggregation control means for determining a priority for each of the physical links based on the signal level for each of the physical links notified by the second apparatus, the link aggregation control means notifying the packet transfer processing means of the first apparatus and the second apparatus about the priority.

Other wireless transmission system of the present invention is directed to a wireless transmission system includes a first apparatus and a second apparatus that carry out wireless data communication via a wireless transmission path using a plurality of physical links in parallel. The first apparatus and the second apparatus each include: an input/output port that inputs and outputs data; a plurality of wireless signal processing means for respectively controlling different ones of the physical links; and packet transfer processing means for selecting, out of the physical links structuring the wireless transmission path, the physical link having a usable band of a prescribed capacity and given a high priority as a data recipient. The wireless signal processing means of the first apparatus respectively measure reception signal levels of the physical links, and the first apparatus further includes link aggregation control means for determining a priority for each of the physical links based on the reception signal levels, the link aggregation control means notifying the packet transfer processing means of the first apparatus and the second apparatus about the priority.

A wireless transmission apparatus of the present invention is directed to a wireless transmission apparatus including: an input/output port that inputs and outputs data; a plurality of wireless signal processing means for controlling one of a plurality of physical links structuring a wireless transmission path being used in parallel, the plurality of wireless signal processing means respectively measuring reception signal levels of the physical links, and the plurality of wireless signal processing means notifying a counterpart apparatus about the reception signal levels; link aggregation control means for determining a priority for each of the physical links based on the signal level for each of the physical links notified by the wireless signal processing means of the counterpart apparatus; and packet transfer processing means for selecting, out of the physical links structuring the wireless transmission path, the physical link having a usable band of a prescribed capacity and a high priority as a data recipient.

A wireless transmission method of the present invention is directed to a wireless transmission method including: controlling each of a plurality of physical links structuring a wireless transmission path being used in parallel; measuring a reception signal level for each of the physical links; notifying a communication counterpart about the reception signal level; determining a priority for each of the physical links based on the signal level for each of the physical links notified by the communication counterpart; and selecting, out of the physical links structuring the wireless transmission path, the physical link having a usable band of a prescribed capacity and a high priority as a data recipient.

A non-transitory computer readable medium storing a wireless transmission program of the present invention is directed to a non-transitory computer readable medium that stores a wireless transmission program for causing a computer to perform operations of: controlling each of a plurality of physical links structuring a wireless transmission path being used in parallel; measuring a reception signal level for each of the physical links; notifying a communication counterpart about the reception signal level; determining a priority for each of the physical links based on the signal level for each of the physical links notified by the communication counterpart; and selecting, out of the physical links structuring the wireless transmission path, the physical link having a usable band of a prescribed capacity and a high priority as a data recipient.

Advantageous Effects of Invention

The present invention can provide a wireless transmission system, a wireless transmission apparatus, a wireless transmission method, and a computer readable medium, with which prescribed communication quality can be secured in wireless communication using the link aggregation technique.

DESCRIPTION OF EMBODIMENTS

Figure 1:
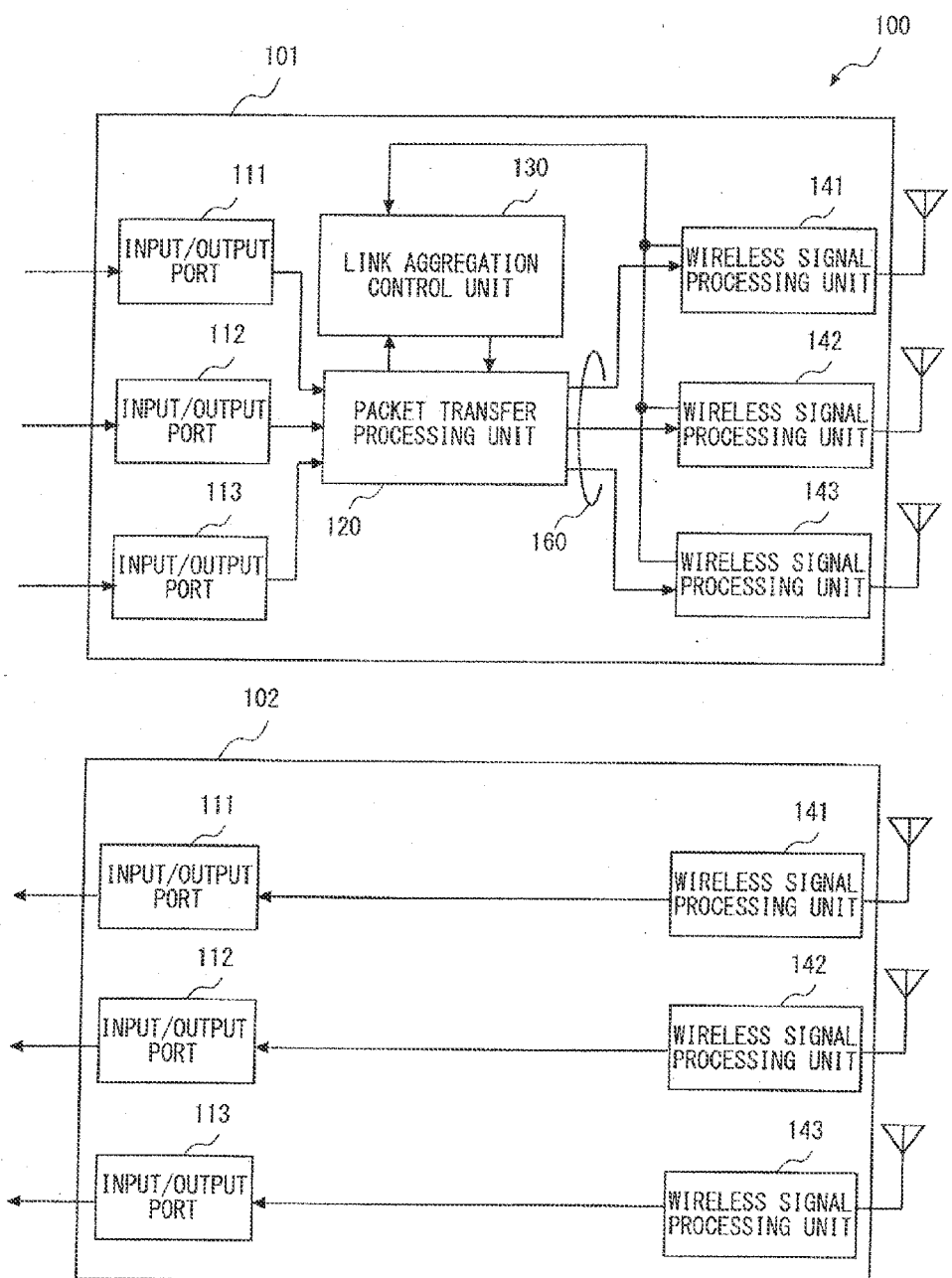
FIG. 1 is a diagram showing a structure according to a first embodiment of the present invention.

In the following, with reference to the drawings, a description will be given of specific embodiments to which the present invention is applied.

First Embodiment

Firstly, with reference to FIG. 1, a description will be given of a structure according to a first embodiment of the present invention.

A wireless transmission system 100 according to the present embodiment includes a wireless transmission apparatus 101 and a wireless transmission apparatus 102 capable of establishing communication between each other via a wireless transmission path. The wireless transmission apparatus 101 and the wireless transmission apparatus 102 are similarly structured. Here, in order to simplify the description, the structure of the wireless transmission apparatus 101 will be described.

The wireless transmission apparatus 101 has input/output ports 111 to 113, packet transfer processing means 120, link aggregation control means 130, and wireless signal processing means 141 to 143. In FIG. 1, while three pieces of the input/output ports 111 to 113 and three pieces of the wireless signal processing means 141 to 143 are shown, the wireless transmission apparatus 101 is not limited to such a structure. The wireless transmission apparatus 101 is only required to include one or more input/output port and a plurality of wireless signal processing means.

The input/output ports 111 to 113 are each a communication port for the wireless transmission apparatus 101 to input and output data signals to and from an external apparatus via a wireless transmission path.

The wireless signal processing means 141 to 143 each have a wireless communication antenna, and each form an independent physical link, that is, a wireless transmission link, with the wireless transmission apparatus 102. Here, the specification of the physical layers of the plurality of wireless transmission links may be different from one another. The wireless signal processing means 141 to 143 are capable of respectively controlling the transmission paths with different physical layers, to perform packet transfer in the data link layer in a unified manner.

The plurality of wireless transmission links are handled as a virtually bundled transmission path, that is, a link aggregation group (LAG: Link Aggregation Group) 160, by link aggregation control means 130 and packet transfer control means 120, whose description will be given later.

The wireless signal processing means 141 to 143 transmit, via the wireless transmission links, packets input from the packet transfer processing means 120, whose description will be given later, to the wireless transmission apparatus 102. Specifically, the wireless signal processing means 141 to 143 respectively control wireless transmission-reception antennas to transmit wireless signals obtained by modulating transmission data by a prescribed scheme. Further, the wireless signal processing means 141 to 143 demodulate the wireless signals received at the wireless transmission-reception antennas to obtain reception data.

Further, the wireless signal processing means 141 to 143 measure the levels of signals received at the wireless reception antennas, and transfer the measurement result to the link aggregation control means 130, whose description will be given later.

The packet transfer processing means 120 selects a transfer route according to address information of the packets input from the input/output ports 111 to 113 or the wireless signal processing means 141 to 143. That is, the packet transfer processing means 120 carries out the process of transferring packets to the output route. Specifically, the packet transfer processing means 120 transfers the packets being input from the input/output ports 111 to 113 to a specific wireless transmission link structuring the LAG 160, based on priorities notified by the link aggregation control means 130, whose description will be given later. That is, the packet transfer processing means 120 transfers the packets to any of the wireless signal processing means 141 to 143.

The link aggregation control means 130 manages the wireless transmission links structuring the LAG 160 and controls the priorities. That is, the link aggregation control means 130 determines priorities based on the reception signal levels notified by the wireless signal processing means 141 to 143, and notifies the packet transfer processing means 120 about the priorities.

Next, with reference to FIG. 2, a description will be given of operations according to the present embodiment.

Wireless transmission apparatuses 201 and 202 are both structured identically to the wireless transmission apparatus 101 and the wireless transmission apparatus 102 described above. However, for the sake of convenience in describing, FIG. 2 shows an example in which the wireless transmission apparatus 201 operates mostly as the transmitter and the wireless transmission apparatus 202 operates mostly as the receiver.

The wireless signal processing means 211 and 214, 212 and 215, and 213 and 216 respectively form wireless transmission links 221 to 223 being independent of one another. The wireless transmission apparatuses 201 and 202 are capable of carrying out bidirectional data communication via the LAG structured by the wireless transmission links 221 to 223. Specifically, in the present embodiment, packets 231 to 233 are transmitted in the direction from the wireless transmission apparatus 201 to the wireless transmission apparatus 202 via the LAG structured by the wireless transmission links 221 to 223.

Figure 2:
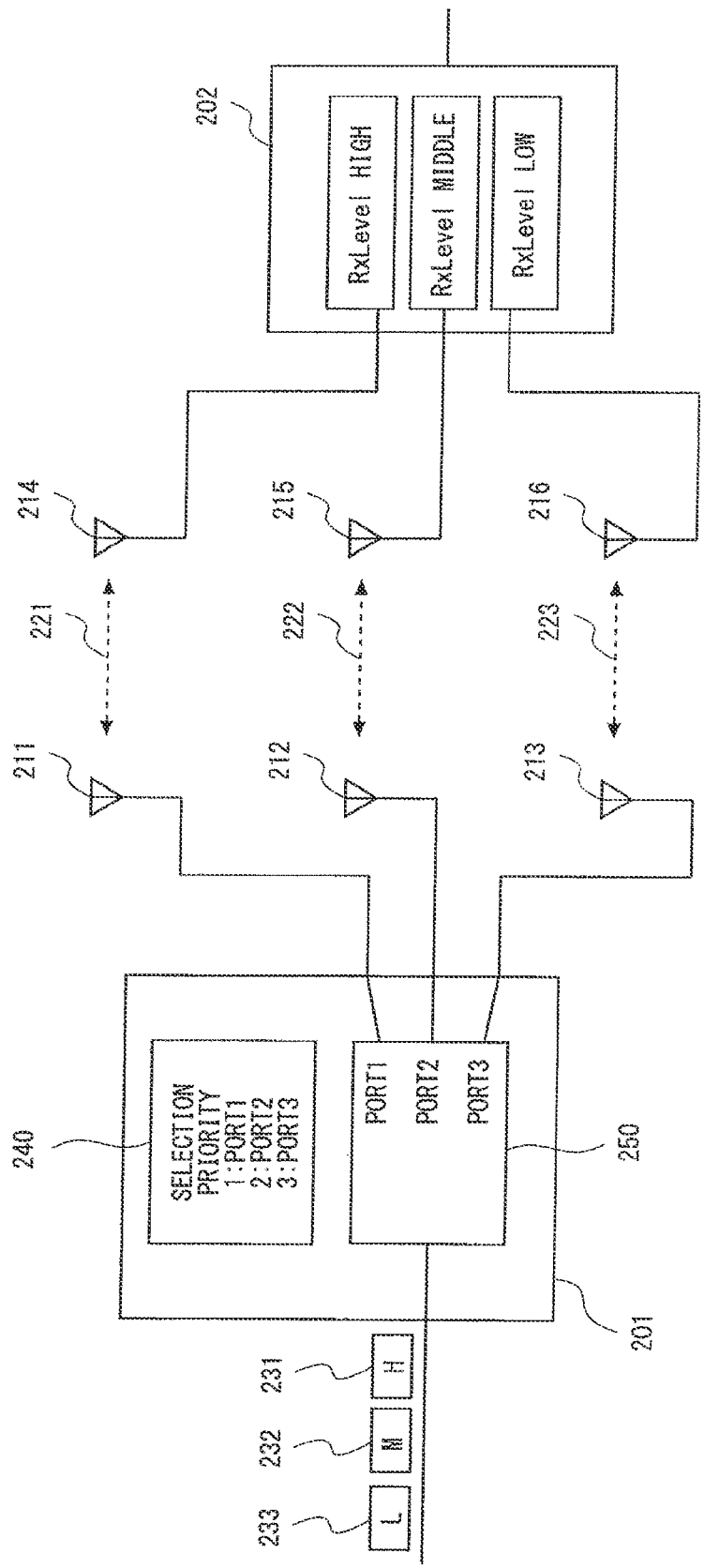
FIG. 2 is a diagram showing operations according to the first embodiment of the present invention.

In FIG. 2, the notation H, M, and L respectively allotted to the packets 231 to 233 show priorities of the packets. That is, the packets 231 to 233 are respectively the high priority packet, the middle priority packet, and the low priority packet. Note that, the notation does not limit the present invention to the case where the priority levels given to the packets are three.

In the present embodiment, the wireless transmission apparatuses 201 and 202 operate as follows.

Firstly, the wireless signal processing means 214 to 216 of the wireless transmission apparatus 202 measure the reception signal level of the wireless communication antennas. Here, it is understood that, as to the reception signal level measured at each of the wireless signal processing means 214 to 216, the reception signal level is high at the wireless signal processing means 214, middle at the wireless signal processing means 215, and low at the wireless signal processing means 216.

Next, the wireless signal processing means 214 to 216 feed back the measurement result to the wireless transmission apparatus 201 via the wireless transmission links 221 to 223.

The link aggregation control means 240 of the wireless transmission apparatus 201 acquires the measurement result of the reception signal levels at the wireless transmission apparatus 202 respectively received by the wireless signal processing means 211 to 213. The link aggregation control means 240 determines, in accordance with the reception signal levels at the wireless signal processing means 214 to 216 included in the measurement result, the priorities in the LAG of the wireless transmission links corresponding to the wireless signal control means. Specifically, in the present embodiment, the priority of the wireless transmission link 221 is determined to be 1; the priority of the wireless transmission link 222 is determined to be 2; and the priority of the wireless transmission link 223 is determined to be 3. Here, the smaller the numerical value, the higher the priority. The wireless transmission link of a higher reception level is given a higher priority because the wireless transmission link of a higher reception signal level is more likely to perform accurate demodulation on the counterpart side, and consequently the packet loss rate can be reduced.

Subsequently, the packet transfer processing means 250 of the wireless transmission apparatus 201 performs analysis of the address information of the packets 231, 232 and 233 received at the input port. Thereafter, the packet transfer processing means 250 successively transfer the packets according to the order based on the priorities of the packets to the wireless transmission links determined according to the priorities determined by the link aggregation control means 240.

Figure 3:
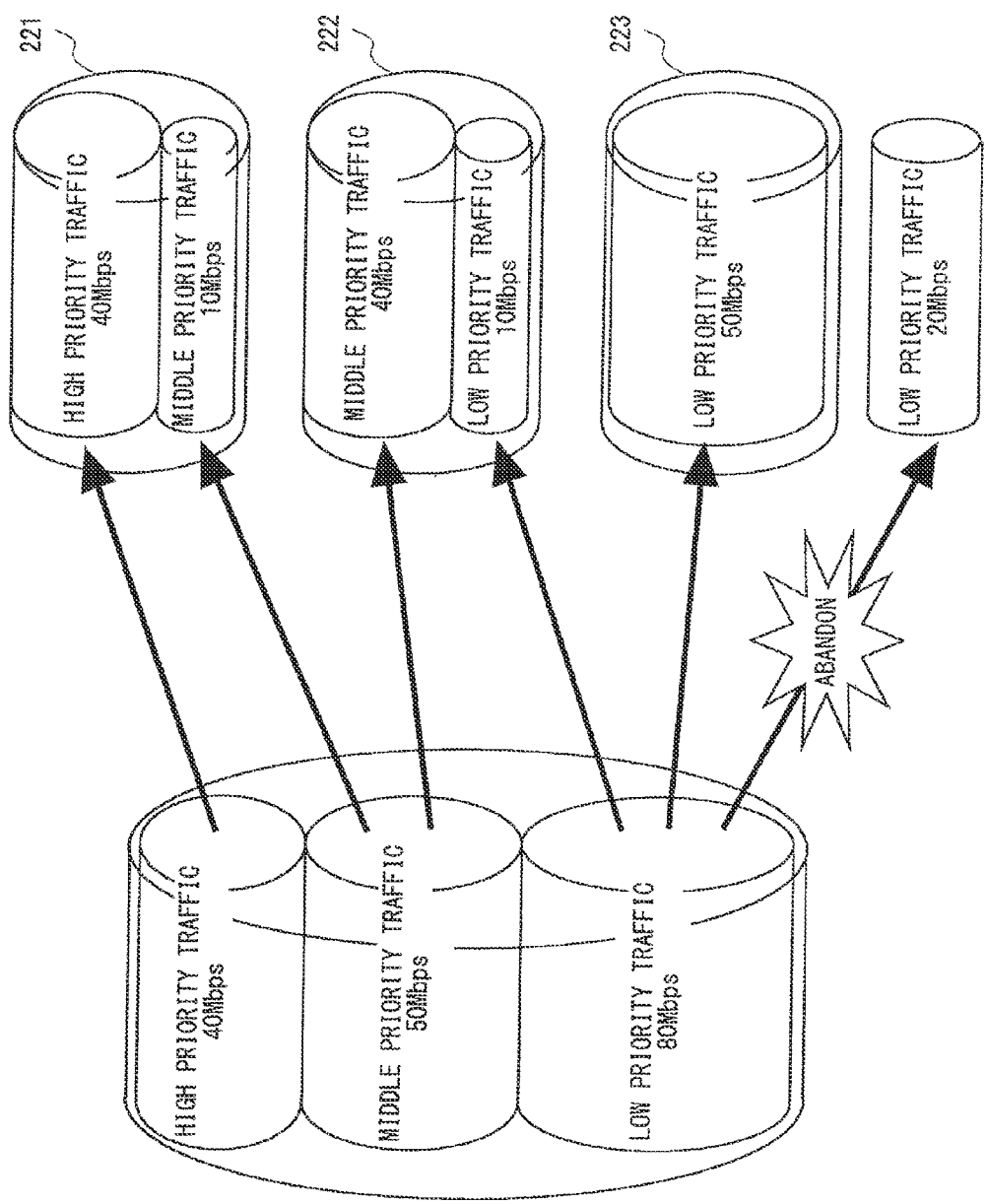
FIG. 3 is a diagram showing operations according to the first embodiment of the present invention.

For example, as shown in FIG. 3, it is understood that the band of each of the wireless transmission links 221 (priority 1), 222 (priority 2), and 223 (priority 3) is 50 Mbps, and the input rate of the high priority packets, the middle priority packets, and the low priority packets is 40 Mbps, 50 Mbps, and 80 Mbps, respectively. In this case, firstly, the high priority packets are transferred using the band 40 Mbps of the wireless transmission link 221 of priority 1. Subsequently, the middle priority packets are transferred using the band 10 Mbps being the remainder of the band of the wireless transmission link 221 and the band 40 Mbps of the wireless transmission link 222 of priority 2. Finally, the low priority packets are transferred using 10 Mbps being the remainder of the band of the wireless transmission link 222 and the band 50 Mbps of the wireless transmission link 223 of priority 3. Here, when the band of the wireless transmission link is insufficient for the input rate of the packets, the packets beyond the transfer capacity are abandoned.

In this manner, by successively allocating packets according to the order based on the priorities of the packets to the wireless transmission links determined according to the order based on the priorities of the wireless transmission links, the packets of the higher priority can be transferred using the wireless transmission link of the better reception state.

In the present embodiment, by carrying out transmission selecting the physical link of excellent quality for the high priority traffic, the packet loss rate of the high priority traffic can be reduced.

Further, in the present embodiment, priority control can be exerted without adding complicated processes, because transfer is carried out in turn from the high priority traffic in accordance with the order of priorities of the wireless transmission links structuring the LAG.

Second Embodiment

Next, a description will be given of the structure according to a second embodiment of the present invention. In the present embodiment, AMR is used for controlling the wireless transmission links. AMR stands for Adaptive Modulation Radio scheme, that is, the scheme for controlling wireless transmission links with which a modulation scheme can be automatically selected.

The constituent elements in the present embodiment are similar to those in the first embodiment. That is, the wireless transmission apparatus 101 and the wireless transmission apparatus 102 shown in FIG. 1 are included. As shown in FIG. 2, these apparatuses carry out wireless communication via the wireless transmission links 221 to 223.

On the other hand, the present embodiment is characterized by the operations of the link aggregation control means 130 and the wireless signal processing means 141 to 143.

With reference to FIG. 1, a description will be given of operations of the link aggregation control means 130 and the wireless signal processing means 141 to 143.

Firstly, when the wireless signal processing means 141 to 143 receive a notification about the reception signal level from the counterpart apparatus, the wireless signal processing means 141 to 143 select a proper modulation scheme corresponding to the reception signal level. Specifically, when the reception signal level is high, a modulation scheme of high transmission rate such as a multi-value modulation scheme (e.g., 256 QAM) is selected; when the reception signal level is low, a modulation scheme such as a few-value modulation scheme (e.g., QPSK) whose transmission rate is low but which possesses high error correction ability is selected. From this time point onward, the wireless signal processing means 141 to 143 carry out wireless communication with the counterpart apparatus using the modulation scheme selected here.

Subsequently, the wireless signal processing means 141 to 143 notify the link aggregation control means 240 about at least the modulation scheme selected here.

The link aggregation control means 130 determines a priority for each of the wireless transmission links 221 to 223 in accordance with the modulation scheme selected by the wireless signal processing means 141 to 143. That is, a high priority is given to the wireless transmission link for which a modulation scheme of high transmission rate has been selected, and a low priority is given to the wireless transmission link for which a modulation scheme of low transmission rate has been selected.

With reference to FIG. 2, a description will be given of specific exemplary operations according to the present embodiment.

The wireless transmission apparatus 201 receives feedback of the reception signal level from the counterpart wireless transmission apparatus 202. Here, it is understood that the reception signal level being fed back is high at the wireless signal processing means 214, middle at the wireless signal processing means 215, and low at the wireless signal processing means 216.

The not-shown wireless signal processing means of the wireless transmission apparatus 201 selects a proper modulation scheme based on the received signal level. In the present embodiment, in order of the wireless transmission links 221 to 223, a modulation scheme of the lower transmission rate is selected. The wireless transmission link wireless signal processing means transfers the modulation scheme selected here to the link aggregation control means 240.

The link aggregation control means 240 determines priorities of the wireless transmission links 221 to 223 in the LAG based on the transmittable band determined for each modulation scheme. In the present embodiment, the wireless transmission link 221 is given priority 1, the wireless transmission link 222 is given priority 2, and the wireless transmission link 223 is given priority 3.

From this time point onward, the traffic distribution to the wireless transmission links 221 to 223 is performed according to the procedure similar to that in the first embodiment. That is, the packet transfer processing means 250 successively transfers packets according to the order based on the priorities of the packets to the wireless transmission links determined according to the order based on the priorities determined by the link aggregation control means 240.

Figure 4:
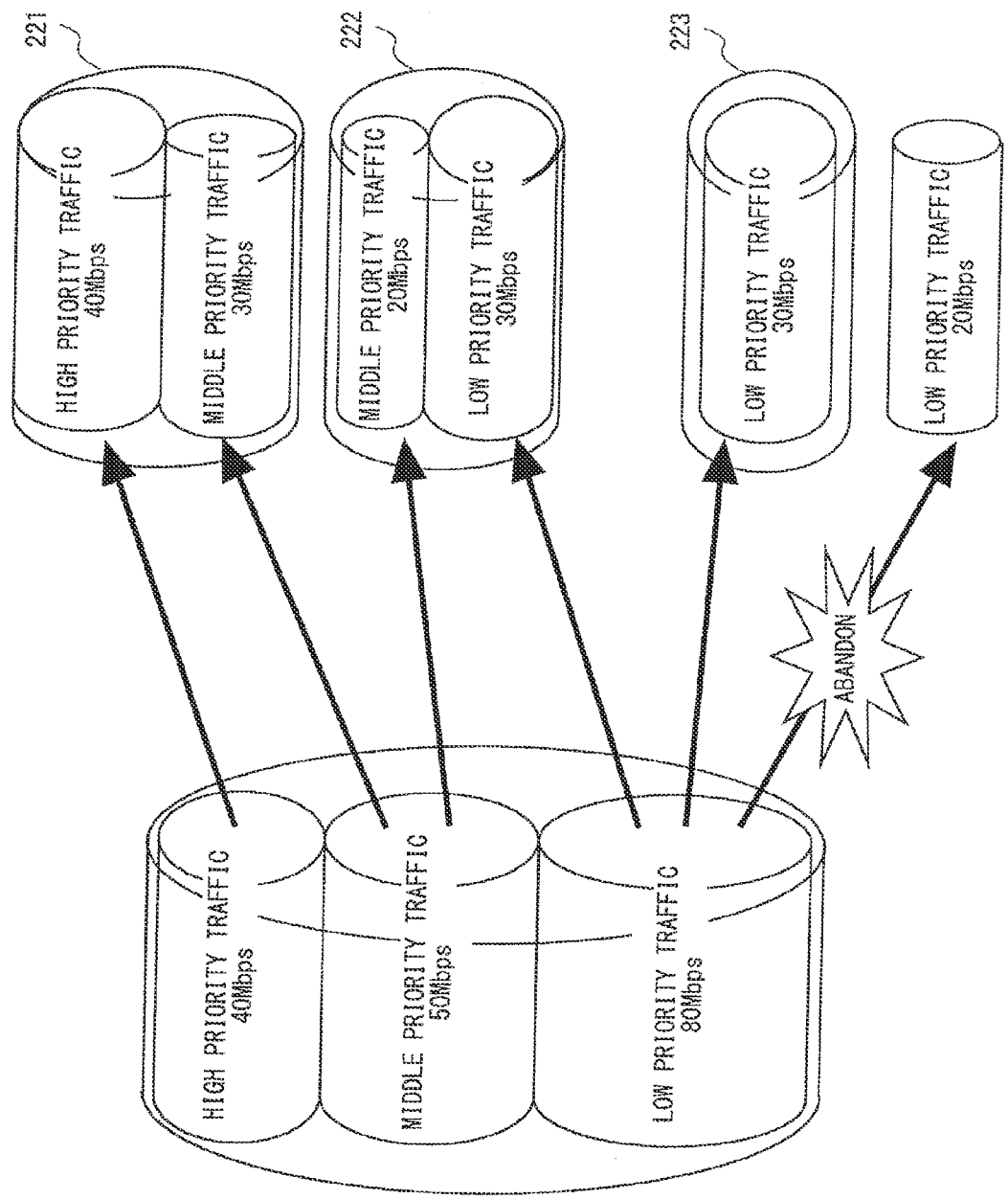
FIG. 4 is diagram showing operations according to a second embodiment of the present invention.

For example, as shown in FIG. 4, it is understood that the band of the wireless transmission links 221 (priority 1), 222 (priority 2), and 223 (priority 3) is 70 Mbps, 50 Mbps, and 30 Mbps, respectively, and the input rate of the high priority packets, the middle priority packets, and the low priority packets is 40 Mbps, 50 Mbps, and 80 Mbps, respectively. In this case, firstly, the high priority packets are transferred using the band 40 Mbps of the wireless transmission link 221 of priority 1. Subsequently, the middle priority packets are transferred using the band 30 Mbps being the remainder of the band of the wireless transmission link 221 and the band 20 Mbps of the wireless transmission link 222 of priority 2. Finally, the low priority packets are transferred using 30 Mbps being the remainder of the band of the wireless transmission link 222 and the band 30 Mbps of the wireless transmission link 223 of priority 3. Note that, when the band of the wireless transmission link is insufficient for the input rate of the packets, the packets beyond the transfer capacity are abandoned.

In the present embodiment, by carrying out transmission using a modulation scheme of high transmission rate for the high priority traffic, packets of high priority traffic can be surely transferred at high speeds.

In the foregoing, while the present invention has been described with reference to the embodiments, the present invention is not limited thereby. Various modifications that can be understood by those skilled in the art can be made to the structure and details of the present invention within the scope of the invention.

For example, in the embodiments described above, the wireless transmission apparatus 101 and the wireless transmission apparatus 102 each have the function of determining the priorities of the wireless transmission links at the link aggregation control means 130. However, they may be structured such that: only one of the wireless transmission apparatuses, for example, the wireless transmission apparatus 101, has such a function, and the link aggregation control means 130 of the wireless transmission apparatus 101 notifies the packet transfer control means 120 of the counterpart wireless transmission apparatus 102 about the determined priorities; and the packet transfer control means 120 of the wireless transmission apparatus 102 controls traffic using the priorities. In this case, the wireless signal processing means 141 to 143 of the wireless transmission apparatus 101 that make the determination as to priorities do not necessarily have the function of measuring the reception signal level and notifying the wireless transmission apparatus 102 about the reception signal level. Further, the counterpart wireless transmission apparatus 102 may not have the link aggregation control means 130. Still further, in the foregoing embodiments, the wireless transmission apparatus 101 and the wireless transmission apparatus 102 each measure the reception signal level at the wireless signal processing means 141 to 143 and have the function of notifying the counterpart apparatus about the reception signal level. However, they may be structured such that: only the wireless transmission apparatus 101 has such a function, and transfers the measured reception signal level to the link aggregation control means 130 in the wireless transmission apparatus 101; and the link aggregation control means 130 determines priorities and notifies the counterpart wireless transmission apparatus 102 about the priorities. In this case, the wireless signal processing means 141 to 143 of the wireless transmission apparatus 102 may not have the function of measuring the reception signal level and reporting the counterpart apparatus about the reception signal level.

Further, in the foregoing embodiments, though the present invention has been described as the hardware structure, the present invention is not limited thereto, and any process can be realized by causing a CPU (Central Processing Unit) to execute a computer program. In this case, the computer program can be provided to a computer as being stored using various types of non-transitory computer readable media. The non-transitory computer readable media include various types of tangible storage media. Examples of non-transitory computer readable media include magnetic storage media (e.g., flexible disks, magnetic tapes, and hard disk drives), optical magnetic storage media (e.g., magneto-optical disks), CD-ROM (Read Only Memory), CD-R, CD-R/W, semiconductor memories (e.g., mask ROM, PROM (Programmable ROM), EPROM (Erasable PROM), flash ROM, and RAM (random access memory)). Further, the program may be provided to a computer using various types of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The present application is based upon and claims the benefit of priority from Japanese Patent Application No. 2011-144107, filed on Jun. 29, 2011, the disclosure of which is incorporated herein in its entirety by reference.

The foregoing embodiments can also be partially or wholly described as in the following Supplementary Notes, but are not limited to the following.

(Supplementary Note 1)

A wireless transmission system including a first apparatus and a second apparatus that carry out wireless data communication via a wireless transmission path using a plurality of physical links in parallel, wherein the first apparatus and the second apparatus each include:
an input/output port that inputs and outputs data;
a plurality of wireless signal processing means for respectively controlling different ones of the physical links, the plurality of wireless signal processing means respectively measuring reception signal levels of the physical links, and the plurality of wireless signal processing means notifying a counterpart one of the first and second apparatuses about the reception signal levels;

link aggregation control means for determining a priority for each of the physical links based on the signal level for each of the physical links notified by the wireless signal processing means of the counterpart apparatus; and packet transfer processing means for selecting, out of the physical links structuring the wireless transmission path, the physical link having a usable band of a prescribed capacity and a high priority as a data recipient.

(Supplementary Note 2)

A wireless transmission system including a first apparatus and a second apparatus that carry out wireless data communication via a wireless transmission path using a plurality of physical links in parallel, wherein the first apparatus and the second apparatus each include:
an input/output port that inputs and outputs data;
a plurality of wireless signal processing means for respectively controlling different ones of the physical links; and packet transfer processing means for selecting, out of the physical links structuring the wireless transmission path, the physical link having a usable band of a prescribed capacity and a high priority as a data recipient, wherein the wireless signal processing means of the second apparatus respectively measure reception signal levels of the physical links, the wireless signal processing means of the second apparatus notifying the first apparatus about the reception signal levels, and the first apparatus further includes link aggregation control means for determining a priority for each of the physical links based on the signal level for each of the physical links notified by the second apparatus, the link aggregation control means notifying the packet transfer processing means of the first apparatus and the second apparatus about the priority.

(Supplementary Note 3)

A wireless transmission system including a first apparatus and a second apparatus that carry out wireless data communication via a wireless transmission path using a plurality of physical links in parallel, wherein the first apparatus and the second apparatus each include:

an input/output port that inputs and outputs data;

a plurality of wireless signal processing means for respectively controlling different ones of the physical links; and packet transfer processing means for selecting, out of the physical links structuring the wireless transmission path, the physical link having a usable band of a prescribed capacity and given a high priority as a data recipient, wherein the wireless signal processing means of the first apparatus respectively measure reception signal levels of the physical links, and the first apparatus further includes link aggregation control means for determining a priority for each of the physical links based on the reception signal levels, the link aggregation control means notifying the packet transfer processing means of the first apparatus and the second apparatus about the priority.

(Supplementary Note 4)

The wireless transmission system according to one of Supplementary Notes 1 to 3, wherein the wireless signal processing means determines a modulation scheme for each of the physical links based on the reception signal levels being notified, and the link aggregation control means determines the priority for each of the physical links based on the modulation scheme for each of the physical links.

(Supplementary Note 5)

The wireless transmission system according to one of Supplementary Notes 1 to 4, wherein the data includes packet priorities, and the packet transfer processing means transmits the data to the physical link of a high priority, according to an order determined by the packet priorities.

(Supplementary Note 6)

A wireless transmission apparatus including:

an input/output port that inputs and outputs data;

a plurality of wireless signal processing means for controlling one of a plurality of physical links structuring a wireless transmission path being used in parallel, the plurality of wireless signal processing means respectively measuring reception signal levels of the physical links, and the plurality of wireless signal processing means notifying a counterpart apparatus about the reception signal levels;

link aggregation control means for determining a priority for each of the physical links based on the signal level for each of the physical links notified by the wireless signal processing means of the counterpart apparatus; and packet transfer processing means for selecting, out of the physical links structuring the wireless transmission path, the physical link having a usable band of a prescribed capacity and a high priority as a data recipient.

(Supplementary Note 7)

A wireless transmission apparatus including:

an input/output port that inputs and outputs data;

a plurality of wireless signal processing means for controlling one of a plurality of physical links structuring a wireless transmission path being used in parallel;

packet transfer processing means for selecting, out of the physical links structuring the wireless transmission path, the physical link having a usable band of a prescribed capacity and a high priority as a data recipient; and link aggregation control means for determining a priority for each of the physical links based on the signal level for each of the physical links notified by other wireless transmission apparatus, the link aggregation control means notifying packet transfer processing means of the other wireless transmission apparatus about the priority.

(Supplementary Note 8)

A wireless transmission apparatus including:

an input/output port that inputs and outputs data;

a plurality of wireless signal processing means for controlling one of a plurality of physical links structuring a wireless transmission path being used in parallel, the plurality of wireless signal processing means respectively measuring reception signal levels of the physical links, and the plurality of wireless signal processing means notifying other wireless transmission apparatus about the reception signal levels; and packet transfer processing means for selecting, out of the physical links structuring the wireless transmission path, the physical link having a usable band of a prescribed capacity and a high priority as a data recipient.

(Supplementary Note 9)

A wireless transmission apparatus comprising:

an input/output port that inputs and outputs data;

a plurality of wireless signal processing means for controlling one of a plurality of physical links structuring a wireless transmission path being used in parallel, the plurality of wireless signal processing means respectively measuring reception signal levels of the physical links;

packet transfer processing means for selecting, out of the physical links structuring the wireless transmission path, the physical link having a usable band of a prescribed capacity and a high priority as a data recipient; and link aggregation control means for determining a priority for each of the physical links based on the reception signal levels, the link aggregation control means notifying the packet transfer processing means about the priority.

(Supplementary Note 10)

The wireless transmission apparatus according to Supplementary Note 9, wherein the link aggregation control means notifies also other wireless transmission apparatus about the determined priority.

(Supplementary Note 11)

A wireless transmission apparatus including an input/output port that inputs and outputs data;

a plurality of wireless signal processing means for controlling one of a plurality of physical links structuring a wireless transmission path being used in parallel; and packet transfer processing means for selecting, out of the physical links structuring the wireless transmission path, the physical link having a usable band of a prescribed capacity and a high priority as a data recipient.

(Supplementary Note 12)

The wireless transmission apparatus according to one of Supplementary Notes 6 to 11, wherein the wireless signal processing means determines a modulation scheme for each of the physical links based on the reception signal levels being notified, and the link aggregation control means determines the priority for each of the physical links based on the modulation scheme for each of the physical links.

(Supplementary Note 13)

The wireless transmission apparatus according to one of Supplementary Notes 6 to 12, wherein the data includes packet priorities, and the packet transfer processing means transmits the data to the physical link of a high priority, according to an order determined by the packet priorities.

(Supplementary Note 14)

A wireless transmission method including:

controlling each of a plurality of physical links structuring a wireless transmission path being used in parallel;

measuring a reception signal level for each of the physical links;

notifying a communication counterpart about the reception signal level;

determining a priority for each of the physical links based on the signal level for each of the physical links notified by the communication counterpart; and selecting, out of the physical links structuring the wireless transmission path, the physical link having a usable band of a prescribed capacity and a high priority as a data recipient.

(Supplementary Note 15)

A wireless transmission method including:

controlling one of a plurality of physical links structuring a wireless transmission path being used in parallel;

selecting, out of the physical links structuring the wireless transmission path, the physical link having a usable band of a prescribed capacity and a high priority as a data recipient;

determining a priority for each of the physical links based on the signal level for each of the physical links notified by the communication counterpart; and;

notifying the communication counterpart about the priority.

(Supplementary Note 16)

A wireless transmission method including:

controlling one of a plurality of physical links structuring a wireless transmission path being used in parallel;

measuring a reception signal level for each of the physical links;

notifying a communication counterpart about the reception signal levels; and selecting, out of the physical links structuring the wireless transmission path, the physical link having a usable band of a prescribed capacity and a high priority as a data recipient.

(Supplementary Note 17)

A wireless transmission method comprising:

controlling one of a plurality of physical links structuring wireless transmission path being used in parallel;

measuring a reception signal level for each of the physical links;

determining a priority for each of the physical links based on the reception signal levels; and selecting, out of the physical links structuring the wireless transmission path, the physical link having a usable band of a prescribed capacity and a high priority as a data recipient.

(Supplementary Note 18)

The wireless transmission method according to Supplementary Note 17, wherein a communication counterpart is also notified about the determined priority.

(Supplementary Note 19)

A wireless transmission method including controlling one of a plurality of physical links structuring a wireless transmission path being used in parallel; and selecting, out of the physical links structuring the wireless transmission path, the physical link having a usable band of a prescribed capacity and a high priority as a data recipient.

(Supplementary Note 20)

The wireless transmission method according to one of Supplementary Notes 14 to 19, further including determining a modulation scheme for each of the physical links based on the reception signal levels being notified, wherein the priority for each of the physical links is determined based on the modulation scheme for each of the physical links.

(Supplementary Note 21)

The wireless transmission method according to one of Supplementary Notes 14 to 20, wherein the data includes packet priorities, and the data is transmitted to the physical link of a high priority, according to an order determined by the packet priorities.

(Supplementary Note 22)

A wireless transmission program for causing a computer to perform operations of:

controlling each of a plurality of physical links structuring a wireless transmission path being used in parallel;

measuring a reception signal level for each of the physical links;

notifying a communication counterpart about the reception signal level;

determining a priority for each of the physical links based on the signal level for each of the physical links notified by the communication counterpart; and selecting, out of the physical links structuring the wireless transmission path, the physical link having a usable band of a prescribed capacity and a high priority as a data recipient.

(Supplementary Note 23)

A wireless transmission program for causing a computer to perform operations of:

controlling one of a plurality of physical links structuring a wireless transmission path being used in parallel;

selecting, out of the physical links structuring the wireless transmission path, the physical link having a usable band of a prescribed capacity and a high priority as a data recipient;

determining a priority for each of the physical links based on the signal level for each of the physical links notified by a communication counterpart; and notifying the communication counterpart about the priority.

(Supplementary Note 24)

A wireless transmission program for causing a computer to perform operations of:

controlling one of a plurality of physical links structuring a wireless transmission path being used in parallel;

measuring a reception signal level for each of the physical links;

notifying a communication counterpart about the reception signal level; and selecting, out of the physical links structuring the wireless transmission path, the physical link having a usable band of a prescribed capacity and a high priority as a data recipient.

(Supplementary Note 25)

A wireless transmission program for causing a computer to perform operations of:

controlling one of a plurality of physical links structuring a wireless transmission path being used in parallel;

measuring a reception signal level for each of the physical links;

determining a priority for each of the physical links based on the reception signal level; and selecting, out of the physical links structuring the wireless transmission path, the physical link having a usable band of a prescribed capacity and a high priority as a data recipient.

(Supplementary Note 26)

The wireless transmission program according to Supplementary Note 25, further causing the computer to perform an operation of notifying also a communication counterpart about the determined priority.

(Supplementary Note 27)

A wireless transmission program for causing a computer to perform operations of:

controlling one of a plurality of physical links structuring a wireless transmission path being used in parallel; and selecting, out of the physical links structuring the wireless transmission path, the physical link having a usable band of a prescribed capacity and a high priority as a data recipient.

(Supplementary Note 28)

The wireless transmission program according to one of Supplementary Notes 22 to 27, further causing the computer to perform operations of determining a modulation scheme for each of the physical links based on the reception signal level being notified, wherein the priority for each of the physical links is determined based on the modulation scheme for each of the physical links.

(Supplementary Note 29)

The wireless transmission program according to one of Supplementary Notes 22 to 29, wherein the data includes packet priorities, and the computer is further caused to perform an operation of transmitting the data to the physical link of a high priority, according to an order determined by the packet priorities.

INDUSTRIAL APPLICABILITY

The present invention can be used for various wireless transmission systems, such as a mobile communication system.

REFERENCE SIGNS LIST

100 WIRELESS TRANSMISSION SYSTEM
101 WIRELESS TRANSMISSION APPARATUS
102 WIRELESS TRANSMISSION APPARATUS
111 INPUT/OUTPUT PORT
112 INPUT/OUTPUT PORT
113 INPUT/OUTPUT PORT
120 PACKET TRANSFER PROCESSING MEANS
130 LINK AGGREGATION CONTROL MEANS
141 WIRELESS SIGNAL PROCESSING MEANS
142 WIRELESS SIGNAL PROCESSING MEANS
143 WIRELESS SIGNAL PROCESSING MEANS
201 WIRELESS TRANSMISSION APPARATUS
202 WIRELESS TRANSMISSION APPARATUS
211 WIRELESS SIGNAL PROCESSING MEANS
212 WIRELESS SIGNAL PROCESSING MEANS
213 WIRELESS SIGNAL PROCESSING MEANS
214 WIRELESS SIGNAL PROCESSING MEANS
215 WIRELESS SIGNAL PROCESSING MEANS
216 WIRELESS SIGNAL PROCESSING MEANS
221 WIRELESS TRANSMISSION LINK
222 WIRELESS TRANSMISSION LINK
223 WIRELESS TRANSMISSION LINK
231 HIGH PRIORITY PACKET
231 MIDDLE PRIORITY PACKET
231 LOW PRIORITY PACKET
240 LINK AGGREGATION CONTROL MEANS
250 PACKET TRANSFER PROCESSING MEANS

The invention claimed is:

1. A wireless transmission system comprising:

a first apparatus and a second apparatus that carry out wireless data communication via a wireless transmission path using a plurality of physical links in parallel, wherein the first apparatus and the second apparatus each include:

an input/output port that inputs and outputs data;

a plurality of wireless transceivers that respectively control different ones of the physical links, the plurality of wireless transceivers respectively measuring reception signal levels of the physical links, and the plurality of wireless transceivers notifying a counterpart one of the first and second apparatuses about the reception signal levels;

a processor configured to determine a priority for each of the physical links based on the signal level for each of the physical links notified by the wireless transceiver of the counterpart apparatus; and a packet routing unit that selects, out of the physical links structuring the wireless transmission path, the physical link having a usable band of a prescribed capacity and a high priority as a data recipient;

wherein:

each wireless transceiver selects a modulation scheme for the respective physical link based on the reception signal levels, the processor determines the priority for each of the physical links based on a transmittable band determined for the selected modulation scheme for each of the physical links, and the packet routing unit transmits the data to the physical link so that a high priority packet is transmitted to the physical link of a high priority.

2. The wireless transmission system according to claim 1, wherein the data includes packet priorities, and the packet routing unit transmits the data to the physical link of a high priority, according to an order determined by the packet priorities.

3. A wireless transmission system comprising:

a first apparatus and a second apparatus that carry out wireless data communication via a wireless transmission path using a plurality of physical links in parallel, wherein the first apparatus and the second apparatus each include:

an input/output port that inputs and outputs data;

a plurality of wireless transceivers that respectively control different ones of the physical links; and a packet routing unit that selects, out of the physical links structuring the wireless transmission path, the physical link having a usable band of a prescribed capacity and a high priority as a data recipient, wherein:

the wireless transceivers of the second apparatus respectively measure reception signal levels of the physical links, the wireless transceivers of the second apparatus notifying the first apparatus about the reception signal levels, and the first apparatus further includes a processor configured to determine a priority for each of the physical links based on the signal level for each of the physical links notified by the second apparatus, the further configured to notify the packet routing unit of the first apparatus and the second apparatus about the priority, wherein:
each wireless transceiver selects a modulation scheme for the respective physical link based on the reception signal levels, the processor determines the priority for each of the physical links based on a transmittable band determined for the selected modulation scheme for each of the physical links, and the packet routing unit transmits the data to the physical link so that a high priority packet is transmitted to the physical link of a high priority.

4. A wireless transmission system comprising a first apparatus and a second apparatus that carry out wireless data communication via a wireless transmission path using a plurality of physical links in parallel, wherein the first apparatus and the second apparatus each include:

an input/output port that inputs and outputs data;

a plurality of wireless transceivers that respectively control different ones of the physical links; and a packet routing unit that selects, out of the physical links structuring the wireless transmission path, the physical link having a usable band of a prescribed capacity and given a high priority as a data recipient, wherein the wireless transceivers of the first apparatus respectively measure reception signal levels of the physical links, and the first apparatus further includes a processor configured to determine a priority for each of the physical links based on the reception signal levels, the processor further configured to notify the packet routing unit of the first apparatus and the second apparatus about the priority, wherein:
each wireless transceiver selects a modulation scheme for the respective physical link based on the reception signal levels, the link aggregation control unit determines the priority for each of the physical links based on a transmittable band determined for the selected modulation scheme for each of the physical links, and the packet transfer processing unit transmits the data to the physical link so that a high priority packet is transmitted to the physical link of a high priority.

5. A wireless transmission apparatus comprising:

an input/output port that inputs and outputs data;

a plurality of wireless transceivers that control one of a plurality of physical links structuring a wireless transmission path being used in parallel, the plurality of wireless transceivers respectively measuring reception signal levels of the physical links, and the plurality of wireless transceivers notifying a counterpart apparatus about the reception signal levels;

a processor configured to determine a priority for each of the physical links based on the signal level for each of the physical links notified by a wireless transceiver of the counterpart apparatus; and a packet routing unit that selects, out of the physical links structuring the wireless transmission path, the physical link having a usable band of a prescribed capacity and a high priority as a data recipient, and wherein:
each wireless transceiver selects a modulation scheme for the respective physical link based on the reception signal levels, the processor determines the priority for each of the physical links based on a transmittable band determined for the selected modulation scheme for each of the physical links, and the packet routing unit transmits the data to the physical link so that a high priority packet is transmitted to the physical link of a high priority.

6. The wireless transmission apparatus according to claim 5, wherein:

the data includes packet priorities, and the packet routing unit transmits the data to the physical link of a high priority, according to an order determined by the packet priorities.

7. A wireless transmission method comprising:

controlling each of a plurality of physical links structuring a wireless transmission path being used in parallel;

measuring a reception signal level for each of the physical links;

notifying a communication counterpart about the reception signal level;

selecting a modulation scheme for each of the physical links based on the reception signal levels notified by the communication counterpart;

determining a priority for each of the physical links based on a transmittable band determined for the selected modulation scheme for each of the physical links;

selecting, out of the physical links structuring the wireless transmission path, the physical link having a usable band of a prescribed capacity and a high priority as a data recipient; and transmitting the data to the physical link so that a high priority packet is transmitted to the physical link of a high priority.

8. A non-transitory computer readable medium that stores a wireless transmission program for causing a computer to perform operations of:

controlling each of a plurality of physical links structuring a wireless transmission path being used in parallel;

measuring a reception signal level for each of the physical links;

notifying a communication counterpart about the reception signal level;

selecting a modulation scheme for each of the physical links based on the reception signal levels notified by the communication counterpart;

determining a priority for each of the physical links based on a transmittable band determined for the selected modulation scheme for each of the physical links;

selecting, out of the physical links structuring the wireless transmission path, the physical link having a usable band of a prescribed capacity and a high priority as a data recipient; and transmitting the data to the physical link so that a high priority packet is transmitted to the physical link of a high priority.

* * * * *